Jan. 27, 1959  YEREM KHACHIKIAN  2,870,814
TRACTION DEVICE
Filed June 6, 1957  2 Sheets-Sheet 2
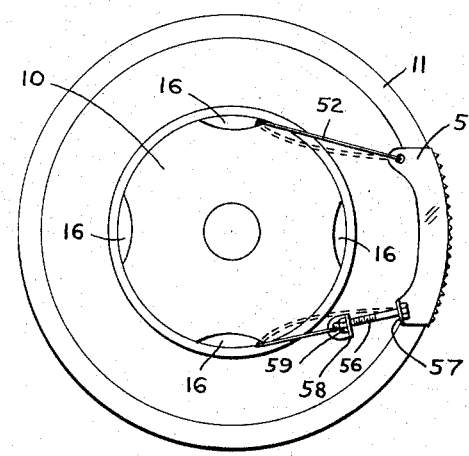
FIG. 6
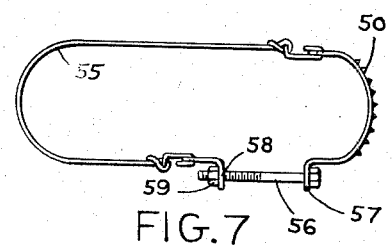
FIG. 7
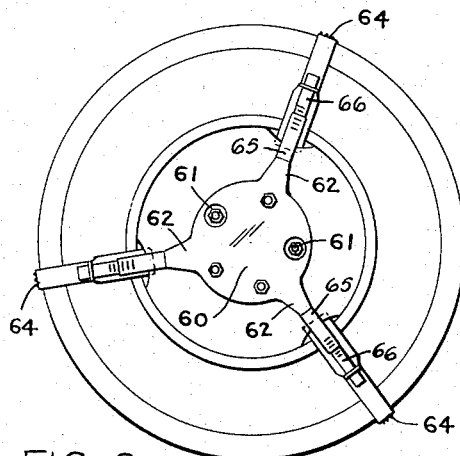
FIG. 8
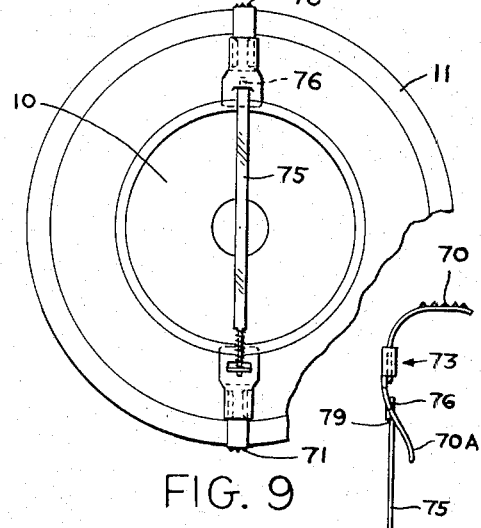
FIG. 9
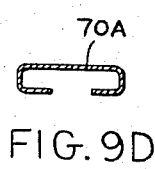
FIG. 9D
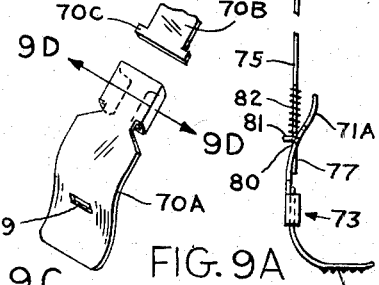
FIG. 9C  FIG. 9A
FIG. 9B
YEREM KHACHIKIAN
INVENTOR.
BY Roy Griffith Jones

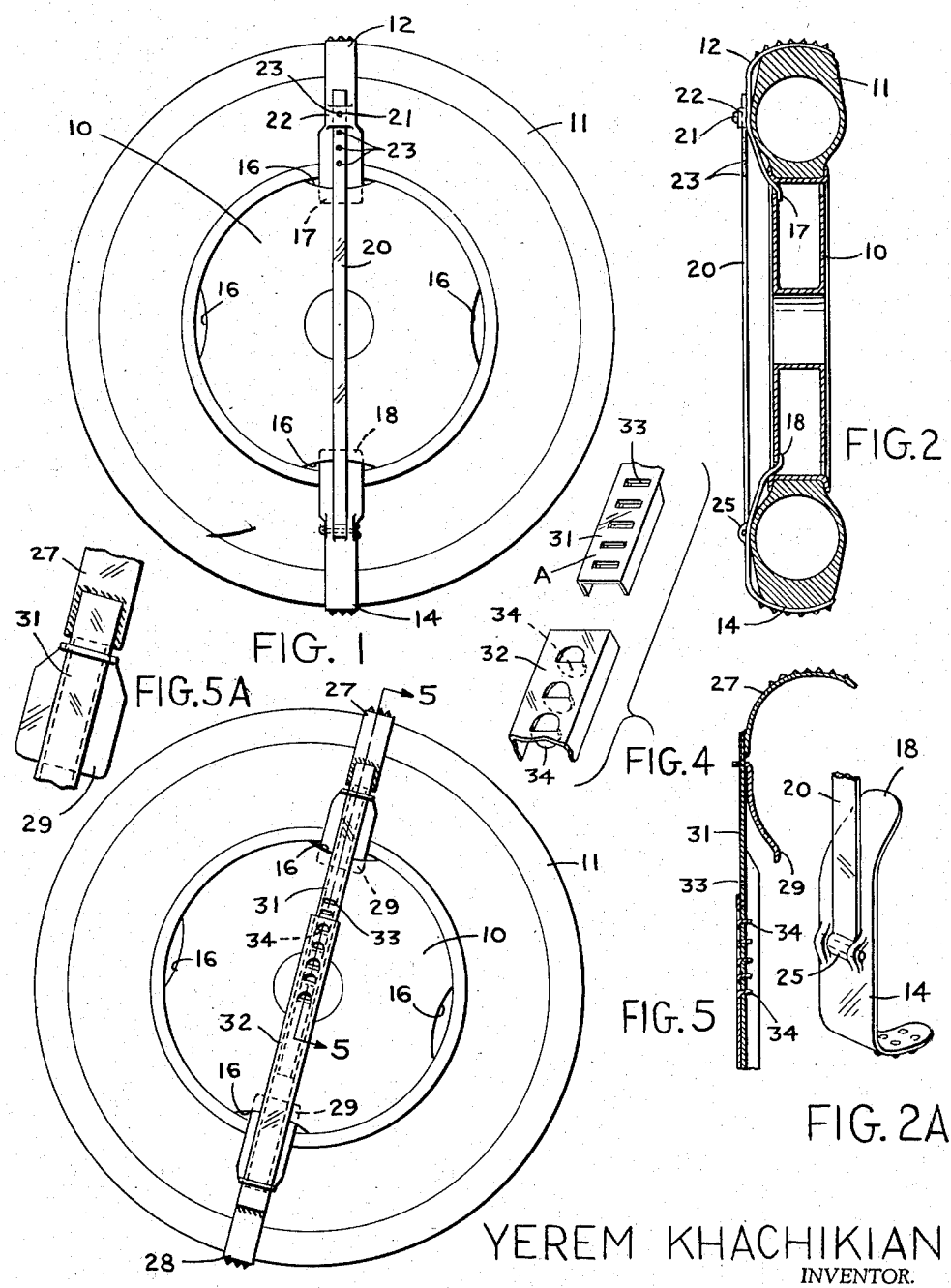

United States Patent Office 2,870,814
Patented Jan. 27, 1959

2,870,814

TRACTION DEVICE

Yerem Khachikian, Newark, N. J.

Application June 6, 1957, Serial No. 664,046

2 Claims. (Cl. 152—218)

This invention relates to traction devices for use on automobile tires, to enable cars to travel over mud, ice, snow, or other slippery surface.

An object of the invention is to provide a very simple and inexpensive form of traction device which may be quickly secured to, and removed from, automobile tires.

The drawings show the invention, and in these:

Figure 1 is an elevationl view of the outer face of a disk wheel, with tire, showing one form of my invention thereon;

Fig. 2 is a central vertical section of Fig. 1;

Fig. 2A is a perspective view of a component of Fig. 2;

Fig. 3 is an elevational view of the outer face of a wheel with tire, showing another form of the invention;

Fig. 4 is a fragmentary exploded view of telescoping members forming part of Fig. 3;

Fig. 5 is a sectional view taken on line 5—5 of Fig. 3;

Fig. 5A is a fragmentary elevational view of Fig. 5;

Fig. 6 is an elevational view of the outer face of a wheel, with tire, showing another form of the invention;

Fig. 7 is a plan view showing the traction plate of Fig. 6 and one securing means;

Fig. 8 is an elevational view, from the outer side of another form of the invention releasably affixed to a wheel; and Fig. 9 is an elevational view of another modification, shown mounted on a wheel;

Fig. 9A is a broken view of the traction device of Fig. 9;

Fig. 9B is an enlarged perspective of the lower part of Fig. 9A;

Fig. 9C is a perspective of part of the structure shown in Fig. 9A; and

Fig. 9D is a section on line 9D—9D of Fig. 9C.

Referring to the drawings for a more detailed description thereof, and at first to Figs. 1 and 2, the wheel shown, having spaced disks 10 and tire 11, has a pair of oppositely disposed traction plates 12 and 14 adjustably and releasably secured thereto. Said traction plates, while shown somewhat curved, do not extend substantially down on the inner side of the tire, so that they may be easily slipped on and off the tire. The plate 12 extends along the outer side wall of the tire to the disk 10 and then passes into one of the usual apertures 16 of the outer wheel disk and a little therebeyond to contact the disk, terminating in a curved portion 17 which bears against the disk. The traction plate 14 is similar to plate 12 and also enters one of the apertures 16 of the disk, and its terminal portion 18 is of the same form as the terminal portion 17 of plate 12. The said two plates are connected together by a bar 20. The latter is secured to plate 12 by a bolt 21, which threadedly engages a lug 22 and passes through an appropriate aperture 23 formed in said bar; the latter has a series of such apertures, and passes through said lug. The traction plate 14 is hinged at 25 to swing outwardly when putting the device on, or taking it off the wheel.

Referring now to Figs. 3, 4 and 5, which show another form of the invention, traction plates 27 and 28 are shown oppositely disposed on the tire 11, being similar to the described plates 12 and 14 of Figs. 1 and 2, including extensions 29, which pass into apertures 16 of the outer wheel disk, to be supported by the latter, as described for Figs. 1 and 2. Extensions 29 are secured to the traction plates 27 and 28 by attachment to telescoping channel-shaped members 31 and 32 respectively, as shown in Fig. 4, the members 31 and 32 being welded to said plates. The U-shaped members 31 and 32 pass through apertures formed in the outer ends of extensions 29 to be connected thereto. Member 31 has a series of spaced oblong apertures 33, into which apertures fit tongues 34 of member 32. The outer ends of said telescoping members have their sides cut away, as clearly shown in Fig. 4.

Referring now to Figs. 6 and 7, which show another form of my invention, a single traction plate 50 is shown on the tire, and as having a ribbed or roughened outer surface. This plate, at one end, is secured to the wheel by a wire 52, which wire is secured to both sides of one end portion of the plate and intermediately passes through opposed apertures 16 of the wheel disk. The other end of the traction plate is secured in part by a wire 55. This wire is secured to the traction plate on the inner side thereof, passes through opposed apertures 16, and is connected to tightening means. The latter comprises a threaded bolt 56 which passes through a lug 57 on the outer side of said plate and also through a small angle iron 58. A nut 59 holds the bolt to the angle iron and the wire 55 is secured to said iron.

Referring now to Fig. 8, shown therein on the wheel, and in contact with the tire, is another form of the invention. It comprises a spider plate 60 secured by bolts 61 to the wheel disk. The plate has three radial equi-spaced projections or legs 62, and to these projections are secured three traction plates 64. The adjustable connection between the projections 62 and the traction plates 64 are similar to the connections shown in Figs. 3 and 4, and comprise telescoped channel-shaped members 65 and 66 attached respectively to projections 62 and plates 64, with punched-out tongues in one of the members fitting into slots in the other, to lock the members together, similar to the members 31 and 32 of Figs. 3, 4 and 5.

In Figs. 9, 9A, 9B, 9C and 9D, another modified form of the invention is shown, comprising traction plates or shoes 70 and 71 which are similar to the plates 12 and 14 of Figs. 1 and 2, except that, as shown at 73, they are divided, and are slidably connected respectively to parts 70A and 71A, which enter slots in the wheel disk and correspond to parts 17 and 18 respectively of the plates or shoes 12 and 14 described in Figs. 1 and 2. As clearly shown in Figs. 9B and 9C, the sliding connection is made by forming a neck or reduced portion 70B and 71B adjacent an end of each shoe, leaving terminal cross-pieces 70C and 71C of the same width as the shoe, and folding over onto these necks the adjacent marginal side portions of the mentioned coacting parts 70A and 71A, shown in Figs. 9B, 9C and 9D. A bar 75 connects the plates or shoes 70 and 71 and is clearly shown in Fig. 9B. This bar is reduced in width at its ends, forming terminal parts 76 and 77. Part 76 enters slot 79 of the extension 70A of shoe 70, while part 77 enters a hole 80 in extension 71A of shoe 71. The hole 80 is formed in a ledge 81, the latter being punched out of extension 71A and bent at right angles thereto. A coiled spring 82 is wound around the reduced portion 77 of the bar 75 and rests on ledge 81 and is compressed, thus exerting pressure to keep reduced portion 76 in aperture 79. The reduced portion 77 is longer than extension 76 and is long enough so that it does not withdraw from hole 80.

What is claimed is:

1. The combination of an automobile disk wheel having a tire mounted thereon, the disk having apertures, a traction device on the wheel and comprising a pair of curved traction plates hooked over the wheel tire transversely, a bar connecting said plates on the outer side only of the wheel, and auxiliary means for holding said plates in place, said means comprising a radial member secured to each of said plates on the outer part only thereof and extending through an aperture of the disk from the outer side only of the disk and bearing against the inner face of the disk and terminating a short distance beyond the aperture.

2. The combination specified in claim 1, in which said bar is slidably connected relative to said plates and a compressed coiled spring around the bar holds the latter resiliently in place.

References Cited in the file of this patent

UNITED STATES PATENTS

| | | |
|---|---|---|
| 2,436,549 | Boyer | Feb. 24, 1948 |
| 2,580,434 | Kennedy | Jan. 1, 1952 |
| 2,746,507 | Morgan | May 22, 1956 |